Patented Dec. 8, 1953

2,662,065

UNITED STATES PATENT OFFICE 2,662,065

PROCESS FOR OBTAINING DISPERSIONS OF POLYFLUOROETHYLENES

Kenneth L. Berry, Hockessin, Del., assignor to E. I. du Pont de Nemours and Company, Wilmington, Del., a corporation of Delaware No Drawing. Application May 10, 1951, Serial No. 225,677

11 Claims. (Cl. 260—29.6)

This invention relates to polymeric materials and, more particularly, to an improved process for preparing colloidal, polymeric, completely halogenated polyfluoroethylenes. This application is a continuation-in-part of applicant's copending application Serial No. 23,400, filed April 26, 1948.

Colloidal polytetrafluoroethylene in the form of an aqueous suspensoid has been obtained by carrying out the polymerization of tetrafluoroethylene in aqueous medium by means of particular catalysts such as disuccinic acid peroxide. A serious disadvantage of this procedure is that the colloid is unstabilized and is coagulated at very low polymer concentrations by the agitation necessary to dissolve the gaseous fluoroethylene monomer. The result is that the desired colloidal polymer is obtained in a state of high dilution with the aqueous reaction medium, necessitating the handling of large amounts of water for a given amount of polymer.

This invention has as an object a new and improved method for obtaining stable aqueous dispersions of colloidal polymeric completely halogenated polyfluoroethylenes which dispersions contain the polymer in relatively high concentration. Other objects will appear hereinafter.

I have found that a surprising increase in concentration of colloidal polymeric polyfluoroethylene in aqueous dispersion can be obtained before coagulation takes place when a monomeric completely halogenated polyfluoroethylene, in which the halogen present consists entirely of fluorine or of fluorine and chlorine, is polymerized in an aqueous medium containing a peroxy polymerization catalyst and a saturated fluorine-containing compound which is liquid under polymerizing conditions for the polyfluoroethylene and which contains 2–21 carbon atoms, not more than one hydrogen, not more than two chlorines and the remainder of the substituents fluorine; the hydrogen and chlorine present being attached to a linear or annular chain carbon further substituted only with fluorine. The effect is particularly marked when the saturated fluorocarbon compound contains only carbon, fluorine, and chlorine.

The polymerization of the monomeric polyfluoroethylene in the above-described aqueous mixture containing the fluorine-containing compound is carried out in accordance with known procedure, which is described in U. S. Patent 2,393,967, and which involves pressures of from 1 to 1000 atmospheres, and temperatures of from 0° C. to 100° C. in the presence of a peroxy catalyst. It is usually advantageous to include with the peroxy catalyst a modifier such as sodium bisulfite. In addition a small amount of water-soluble ferrous salt, e. g., ferrous sulfate, is usually present in amount sufficient to provide from about 0.2 to about 50 parts per million of ferrous ions based on the weight of reaction medium.

In the preferred procedure for carrying out the present invention, a reaction medium comprising distilled water to which has been added small amounts of sodium persulfate or other peroxy catalyst, sodium bisulfite, a trace of a ferrous iron salt, and about 2% of the saturated fluorine-containing compound, based on the total weight of the reaction medium, is charged into a pressure vessel and the vessel is evacuated. Tetrafluoroethylene monomer is introduced until a suitable pressure, e. g., about 60 lb./sq. in. is attained. The closed pressure vessel is heated to about 60° C. with agitation until the colloidal polymer formed begins to coagulate. There results a colloidal dispersion of high molecular weight, film-forming polymeric tetrafluoroethylene.

The fluorine-containing compounds used in the process of this invention are easily recovered, the particular method employed depending on the particular fluorine-containing compound being used. In the case of normally gaseous compounds (which are liquid only under the conditions of polymerization), the fluorine-containing compound is allowed to vaporize out of the colloidal dispersion. Normally liquid fluorine-containing compounds are in the colloidal dispersion as a separate phase and are recovered by decantation or by steam distillation.

The following examples, in which parts are by weight, illustrate the invention more specifically.

*Example I*

Two hundred and fifty parts of distilled water, 0.125 part of ammonium persulfate, 0.06 part of sodium bisulfite, 0.001 part of $FeSO_4 \cdot 7H_2O$, and 5 parts of perfluorodimethylcyclohexane ($C_8F_{16}$) are mixed in a pressure vessel (having a volume capacity of 325 parts of water at room temperature) and the mixture is heated to 60° C. The vessel is evacuated to remove air and then pressured to 60 lb./sq. in. with tetrafluoroethylene. The vessel is maintained at 60° C. and agitated until the colloidal polymer which forms first begins to coagulate. After 5 hours and 26 minutes, agitation is stopped and most of the fluorocarbon settles to the bottom of the reaction vessel and can be separated from the dispersion of the polytetrafluoroethylene. In this reaction, there is formed a 9.0% by weight aqueous colloidal dispersion of high molecular weight, film-forming polytetrafluoroethylene.

In a control experiment at 65° C. in which the perfluorodimethylcyclohexane is omitted, coagulation begins after 37 minutes and there is obtained a dispersion containing only 1.16% of polytetrafluoroethylene.

*Example II*

Two hundred and fifty parts of distilled water, 0.05 part of ammonium persulfate, 0.02 part of sodium bisulfite, 0.001 part of FeSO$_4$.7H$_2$O, and 5 parts of 1,2-dichlorohexafluorocyclobutane (C$_4$Cl$_2$F$_6$) are mixed in a pressure vessel similar to that of Example I and heated to 50° C. The vessel is evacuated to remove air, pressured to 57 lb./sq. in. with tetrafluoroethylene, and shaken for 2.5 hours until the colloidal polymer first begins to coagulate. Agitation is stopped and the fluorine-containing compound is allowed to settle out. There is formed a 4.64% solids dispersion of high molecular weight, tough, film-forming polytetrafluoroethylene.

A control experiment run without any 1,2-dichlorohexafluorocyclobutane afforded only a 0.65% solids dispersion of the polymer.

*Example III*

Two hundred and fifty parts of distilled water, 0.125 part of ammonium persulfate, 0.06 part of sodium bisulfite, and 6 parts of 1-chloro-6-hydroperfluorohexane [H(CF$_2$)$_6$Cl], are heated to 65° C. in a pressure vessel similar to that of Example I and the vessel is evacuated. The vessel is pressured to 58 lb./sq. in. with tetrafluoroethylene and shaken for 3.0 hours until the colloidal polymer first begins to coagulate. Agitation is stopped and the 1-chloro-6-hydroperfluorohexane is allowed to settle out. There is obtained a 5.93% solids dispersion of colloidal polytetrafluoroethylene.

*Example IV*

A mixture of two hundred parts of distilled water, 0.1 part of ammonium persulfate, 0.05 part of sodium bisulfite, 0.002 part of FeSO$_4$.7H$_2$O, and 10 parts of 1,2-dichlorotetrafluoroethane

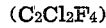

(C$_2$Cl$_2$F$_4$)

contained in an evacuated pressure vessel similar to that of Example I is pressured to 60 lb./sq. in. with tetrafluoroethylene and shaken at room temperature. Coagulation of the colloidal polymer product does not begin until after about 6.4 hours during which time there is produced a 14.7% solids dispersion of polytetrafluoroethylene in which the polymer particles are surprisingly uniform in size and shape and have a mean diameter of 0.3–0.5 micron.

A control experiment without the haloethane yields a 0.75% solids dispersion of polymer in which the particles vary widely in size and shape.

*Example V*

The process of Example III is repeated using a perfluorinated lubricating oil having the emprical composition C$_{21}$F$_{44}$ in place of the 1-chloro-6-hydroperfluorohexane. In 2.1 hours there is obtained a dispersion containing 3.85% by weight of suspended colloidal polytetrafluoroethylene which is a concentration more than five times higher than is possible when the perfluorinated oil is omitted from the mixture.

*Example VI*

Example III is repeated except that 0.001 part of FeSO$_4$.7H$_2$O is included and the 1-chloro-6-hydroperfluorohexane is replaced by perfluorinated kerosene consisting only of carbon and fluorine and containing 10–14 carbons. In 1.6 hr. the concentration of colloidal polytetrafluoroethylene is 2.74% by weight.

Although tetrafluoroethylene is perferred in the invention, chlorotrifluoroethylene and dichlorodifluoroethylene can be used.

Fluorine-containing compounds other than those mentioned in the Examples include 1-chloro-5-hydroperfluoropentane, H(CF$_2$)$_5$Cl, hexafluoroethane, C$_2$F$_6$, octafluoropropane, C$_3$F$_8$, decafluorobutane, C$_4$F$_{10}$, and octafluorocyclobutane C$_4$F$_8$. These saturated fluorine-containing compounds are added to the reaction mixture in proportions of from 1% to 10% by weight based on the total weight of reaction medium. In the polymerization of tetrafluoroethylene, the best results are obtained by adding from 1% to 5% by weight, based on the total weight of the reaction medium, of the saturated fluorine-containing compound.

The fluorine-containing compounds used in the practice of the invention claimed herein are, by comparison with the effects I have observed with silicones or other highly inert liquids, advantageous from the standpoint of economy and of simplicity of operation, for example, the polyfluoroethylene monomer can be introduced into the aqueous polymerization medium as a solution in the fluorine-containing compound, and from the standpoint of obtaining aqueous dispersions containing a relatively high concentration of the completely halogenated polyfluoroethylene polymers. By the present process concentrations of the latter up to 14% or more can be obtained readily.

The dispersions of this invention are useful for fabricating the polymers into a variety of forms. Films can be cast by baking flowouts, and in a similar manner coatings of the polymers can be applied to metal, fabrics, wood, ceramics and carbon. Coatings on metal in the form of wire, foils, materials-handling equipment such as chemical reactors and pipe lines, structural forms, and porous articles made by casting or powder metallurgy techniques are of particular value for their inertness to moisture, corrosive chemicals, solvents and electrical and mechanical stresses. Impregnations are possible because of the small particle size of the polymers. Fabrics are advantageously impregnated to confer water repellency by procedure disclosed in my copending application S. N. 726,717, filed February 5, 1947, now U. S. Patent 2,532,691, and glass fabrics impregnated and coated with the dispersions have unique stability and other desirable properties such as flexibility, high dielectric strength and impermeability. Coated glass fabrics prepared in this way can be used as fuel pump diaphragms and in the fashioning of resistor cores. Casting molds formed from the coated glass fabric by heat and pressure can be used as molds for low-melting metals. Coatings on carbon and ceramics confer moisture protection with resultant increase in surface resistivity and resistance to tracking by an electric arc. The dispersions are also useful as adhesives, particularly for polytetrafluoroethylene sheeting, mica, metals and ceramics. In particular, a polytetrafluoroethylene surface can be permanently joined to a solid substance by application of a dispersion of this invention containing at least 10% of the polymer, drying the joint by heating at not more than 100° C. and subsequently heating the structure to above 327° C.

As many apparently widely different embodiments of this invention may be made without departing from the spirit and scope thereof, it is to be understood that this invention is not limited to the specific embodiments thereof except as defined in the appended claims.

The invention claimed is:

1. A process for obtaining colloidal dispersions of polymeric completely halogenated polyfluoroethylenes, said process comprising polymerizing at a temperature of 0° C. to 100° C. under a pressure of 1 to 1,000 atmospheres with agitation a monomeric completely halogenated polyfluoroethylene in an aqueous medium containing a peroxy polymerization catalyst and 1% to 10%, by total weight of said aqueous medium, of a 2- to 21-carbon atom saturated fluorine-containing compound in which any atoms contained therein other than carbon and fluorine consist of those selected from the group consisting of hydrogen and chlorine, said last mentioned atoms when contained in said fluorine-containing compound being present therein in amount of not more than one hydrogen atom and not more than two chlorine atoms, said hydrogen and chlorine atoms being attached to chain carbon atoms substituted only with fluorine, said saturated fluorine-containing compound being liquid under the prevailing polymerization conditions.

2. The process set forth in claim 1 in which said fluorine-containing compound consists of carbon, fluorine and chlorine and contains not more than two chlorine atoms.

3. The process set forth in claim 1 in which said fluorine-containing compound consists of carbon and fluorine.

4. A process for obtaining colloidal dispersions of polymeric tetrafluoroethylene, said process comprising polymerizing monomeric tetrafluoroethylene at a temperature of 0° C. to 100° C. under a pressure of 1 to 1,000 atmospheres with agitation in an aqueous medium containing a peroxy polymerization catalyst and 1% to 10%, by total weight of said aqueous medium, of a 2- to 21-carbon atom saturated fluorine-containing compound in which any atoms contained therein other than carbon and fluorine consist of those selected from the group consisting of hydrogen and chlorine, said last mentioned atoms when contained in said fluorine-containing compound being present therein in amount of not more than one hydrogen atom and not more than two chlorine atoms, said hydrogen and chlorine atoms being attached to chain carbon atoms substituted only with fluorine, said saturated fluorine-containing compound being liquid under the prevailing polymerization conditions.

5. The process set forth in claim 4 in which said fluorine-containing compound is present in the proportion of 1% to 5%, by total weight of said aqueous medium.

6. The process set forth in claim 4 in which said fluorine-containing compound consists of carbon, fluorine and chlorine and contains not more than two chlorine atoms.

7. The process as set forth in claim 4 in which said fluorine-containing compound is perfluorodimethylcyclohexane.

8. The process set forth in claim 4 in which said fluorine-containing compound is 1,2-dichlorohexafluorocyclobutane.

9. The process set forth in claim 4 in which said fluorine-containing compound is 1-chloro-6-hydroperfluorohexane.

10. The process set forth in claim 4 in which said fluorine-containing compound is 1,2-dichlorotetrafluoroethane.

11. The process set forth in claim 4 in which said fluorine-containing compound is perfluorinated kerosene consisting only of carbon and fluorine and containing 10 to 14 carbon atoms.

KENNETH L. BERRY.

References Cited in the file of this patent
UNITED STATES PATENTS

| Number | Name | Date |
|---|---|---|
| 2,456,027 | Simons | Dec. 14, 1948 |
| 2,559,752 | Berry | July 10, 1951 |
| 2,567,569 | McBee | Sept. 11, 1951 |